United States Patent
Aihara et al.

[11] Patent Number: 5,290,377
[45] Date of Patent: Mar. 1, 1994

[54] METHOD FOR PRODUCING RETICULAR NONWOVEN FABRIC

[75] Inventors: Kintaro Aihara, Chiba; Tadashi Honda, Tokyo; Masashi Kobayashi, Kisarazu; Hideyo Rohyama; Kazuhiko Kurihara, both of Tokyo; Hiroshi Yazawa, Kunitachi; Toshikazu Ohishi, Kawaguchi, all of Japan

[73] Assignees: Nippon Petrochemicals Company, Ltd.; Polymer Processing Research Inst. Ltd., both of Tokyo, Japan

[21] Appl. No.: 730,532

[22] Filed: Jul. 16, 1991

[30] Foreign Application Priority Data

Jul. 17, 1990 [JP] Japan .................... 2-187298

[51] Int. Cl.⁵ .............................. B29C 31/00
[52] U.S. Cl. .................... 156/229; 156/160; 156/164; 156/254; 156/259; 156/263; 156/303
[58] Field of Search ............ 156/229, 254, 259, 263, 156/160, 161, 164, 303

[56] References Cited

U.S. PATENT DOCUMENTS

| | | | |
|---|---|---|---|
| 2,794,750 | 6/1957 | Ness | 156/229 |
| 3,621,628 | 3/1970 | Chidsey, Jr. | 156/229 |
| 3,719,540 | 3/1973 | Hall | 156/267 |
| 3,985,599 | 10/1976 | Lepoutre et al. | 156/229 |
| 4,047,997 | 9/1977 | Sudo | 156/229 |
| 4,171,831 | 10/1979 | Robinson | 156/263 |
| 4,251,585 | 2/1981 | Schwarz | 156/229 |
| 4,348,444 | 9/1982 | Craig | 156/161 |
| 4,666,542 | 5/1987 | De Jonckheere | 156/229 |
| 4,735,673 | 4/1988 | Piron | 156/229 |
| 4,816,094 | 3/1989 | Pomplun et al. | 156/160 |
| 4,883,549 | 11/1989 | Frost et al. | 156/229 |
| 4,943,340 | 7/1990 | Ujimoto et al. | 156/229 |
| 4,992,124 | 2/1991 | Kurihara et al. | 156/229 |
| 4,995,933 | 2/1991 | Brussel | 156/259 |

FOREIGN PATENT DOCUMENTS 1-53383  11/1989  Japan .

Primary Examiner—Patrick J. Ryan
Assistant Examiner—Merrick Dixon
Attorney, Agent, or Firm—Scully, Scott, Murphy & Presser

[57] ABSTRACT

An improved method for producing a reticular nonwoven fabric in which the velocity of the transversely stretching line step can be much increased by providing the transversely stretching step with a longitudinally orienting step, thereby accelerating the whole production line. The method of the invention includes the continuous steps of: a first feeding step to feed a first film material; a longitudinally stretching step to stretch the first film material; a splitting step to split the longitudinally the stretched first film material; a laterally spreading step to spread the split film; a second feeding step to feed a second film material; a longitudinally orienting step to orient the second film material; a transversely slitting step to slit the oriented second film material; a transversely stretching step to stretch the slit second film material; and a laminating step to laminate the first film material with the second film material.

43 Claims, 3 Drawing Sheets

METHOD FOR PRODUCING RETICULAR NONWOVEN FABRIC

BACKGROUND OF THE INVENTION

1. Field of the Invention

The present invention relates to a method for producing reticular nonwoven fabric. More particularly, the invention relates to a method for continuously producing the reticular nonwoven fabric in which a longitudinally oriented reticular first film material is laminated with a transversely oriented reticular second film material.

2. Description of the Prior Art

A production method of this kind is described in Japanese Patent Publication No. 1-53383. This method comprises a continuous process of a longitudinal line step to form a longitudinal web, a transversal line step to form a transversal web and a laminating step to laminate the longitudinal web and the transversal web. The longitudinal line step comprises a continuous process of a film feeding step to feed a nonstretched film in the form of a continuous web, a transversely slitting step to form a number of transversal slits at small regular intervals in view of longitudinal direction, and a transversely stretching step to stretch transversely this transversely slit nonstretched film. Meanwhile, the transversal line step comprises a continuous process of a film feeding step to feed a non-stretched film in the form of a continuous web, a longitudinally slitting step to form a number of longitudinal slits at small regular intervals in view of transversal direction, and a longitudinally stretching step to stretch longitudinally this longitudinally slit nonstretched film.

In the longitudinal line step of this method, because the film is stretched in the longitudinal direction, the discharging velocity of the film is larger than the feeding velocity of the film. In the transversal line step, however, the velocity of feeding of film is the same as that of the discharging of film because the film is not stretched in the longitudinal direction but it is stretched in the transversal direction. The velocity of the whole line depends on the velocity of the transversal line because the velocities of both films must be made the same in the laminating step. Due to this reason, the method is not advantageous in view of the rate of production.

SUMMARY OF THE INVENTION

It is, therefore, the primary object of the present invention to provide a novel method for producing split-fiber nonwoven fabric at a high production rate.

Another object of the present invention is to provide a method for producing the reticular nonwoven fabric in which the velocity of the transversely stretching line step can be much increased, thereby accelerating the whole production line by providing the transversely stretching line step with a longitudinally orienting step.

According to the present invention, the method of producing reticular nonwoven fabric is characterized in that the following steps are carried out continuously: a first feeding step to feed a first film material made of a thermoplastic resin; a longitudinally stretching step to stretch the first film material in the direction parallel to its length; a splitting step to split the stretched first film material in the direction of its length; a laterally spreading step to spread the split film in the direction crosswise to its length; a second feeding step to feed a second film material made of a thermoplastic resin; a longitudinally orienting step to orient the second film material in the direction of its length; a transversely slitting step to slit the oriented second film material in the direction crosswise to its length; a transversely stretching step to stretch the slit second film material in the direction crosswise to its length; and a laminating step to laminate the first film material which was spread in the laterally spreading step with the second film material which was stretched in the transversely stretching step.

The above longitudinally orienting step can include the stretching of the second film material by means of rolling or pseudo-uniaxial orienting (longitudinal stretching with scarcely reducing the width using closely located rolls).

Furthermore, the method for producing reticular nonwoven fabric of the present invention may comprise continuous steps of: a first feeding step to feed a first film material made of a thermoplastic resin; a longitudinally slitting step to slit the first film material in the direction parallel to its length; a longitudinally stretching step to stretch the slit first film material in the direction parallel to its length; a second feeding step to feed a second film material made of a thermoplastic resin; a longitudinally orienting step to orient the second film material in the direction of its length; a transversely slitting step to slit the oriented second film material in the direction crosswise to its length; a transversely stretching step to stretch the slit second film in the direction crosswise to its length; and a laminating step to laminate the first film material which was stretched in the longitudinally stretching step with the second film material which was stretched in the transversely stretching step.

In summary, it is possible according to the present invention to raise the overall rate of production by providing the transversely stretching step with a longitudinally orienting step, thereby improving the velocity of transversely stretching step.

BRIEF DESCRIPTION OF DRAWINGS

The invention will be described in more detail with reference to the following description of preferred embodiments illustrated in the accompanying drawings, in which.

DESCRIPTION OF THE PREFERRED EMBODIMENTS

In the following, an embodiment according to the present invention will be described in detail with reference to the accompanying drawings of FIGS. 1 and 2.

Figure 1:
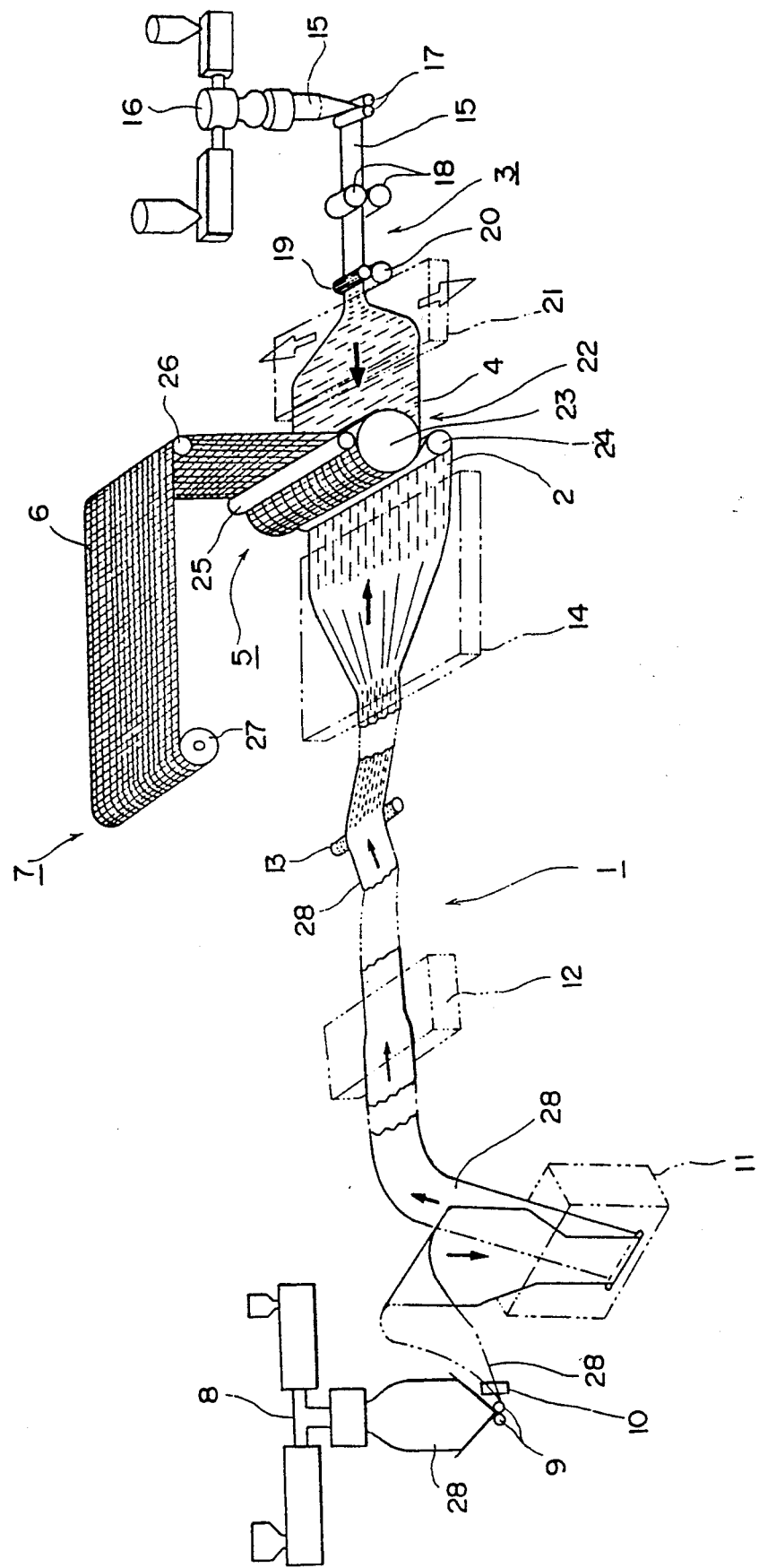
FIG. 1 is a schematic illustration of apparatus for carrying out the method of the present invention.
Figure 2:
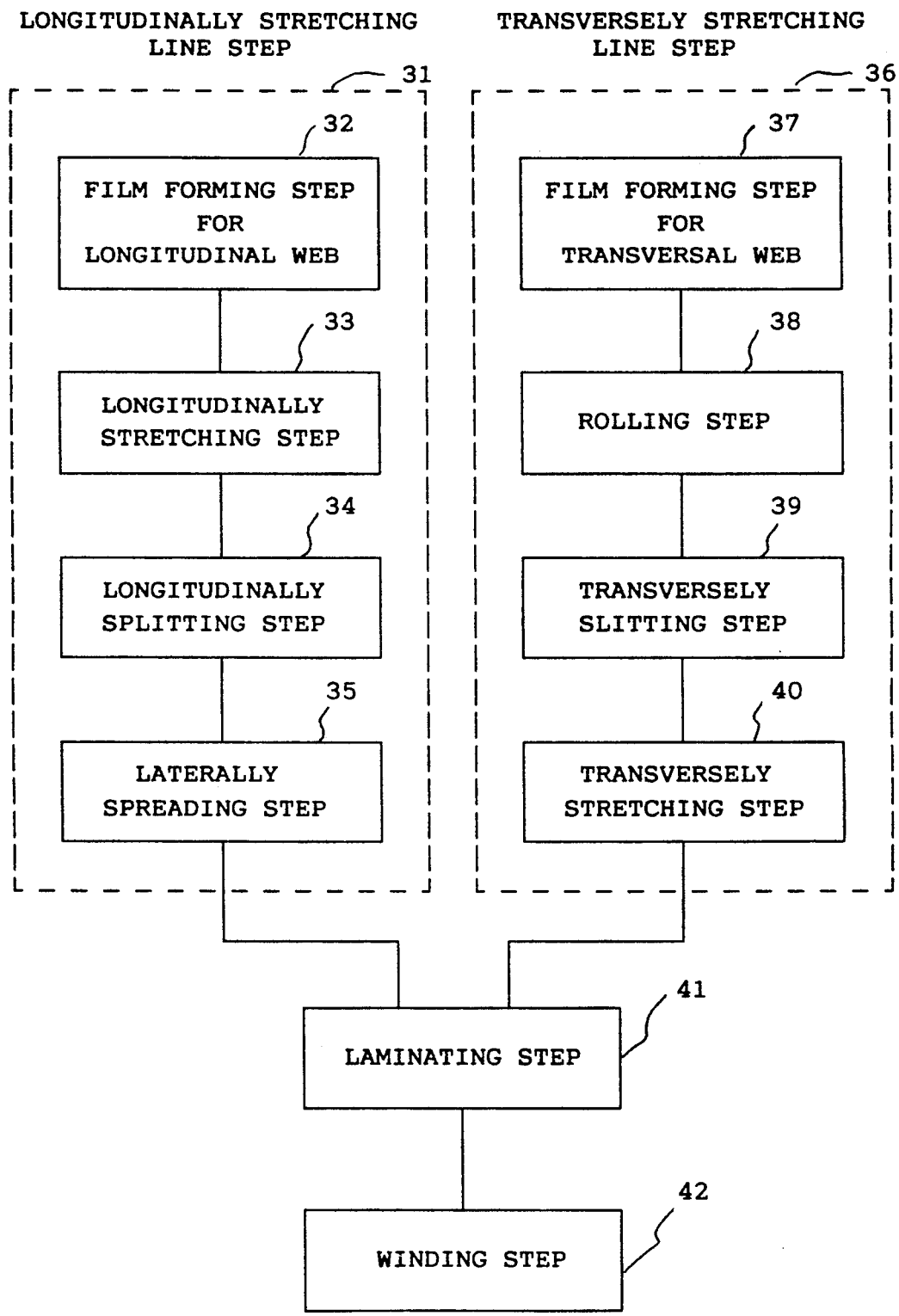
FIG. 2 is a flow sheet of a method of the present invention.

Shown in FIG. 1 are a longitudinal web forming section 1 for forming a longitudinal web 2, a transversal web forming section 3 for forming a transversal web 4, a laminating section 5 to laminate a longitudinal web 2 with a transversal web 4 so as to form a nonwoven fabric 6, and a taking-up section 7 to wind the nonwoven fabric 6.

In the first place, the longitudinal web forming section 1 will be described. The longitudinal web forming section 1 is provided with an extruder 8, to which high density polyethylene and low density polyethylene are fed. The extruder 8 produces a tubular film (first film material) 28. The tubular film 28 is pinched by a pair of pinch rolls 9 to be folded into a sheet-like material. This step is followed by a cut-opening machine 10 which cuts and opens the above folded tubular film into a wide film 28. This wide film 28 is then longitudinally stretched in a first stretching device 11 with, for example, a warm water bath. This stretched film 28 is longitudinally stretched again by a second stretching device 12 using, for example, hot air. The stretched film 28 is then subjected to a splitting device 13 in which a large number of longitudinal splits are formed in the film 28. This longitudinally split film 28 is further spread by a laterally spreading device 14.

In the following, the transversal web forming section 3 will be described. The transversal web forming section 3 is provided with an extruder 16, to which a high melting point thermoplastic resin such as high density polyethylene (HDPE) and a low melting point thermoplastic resin such as low density polyethylene (LDPE) are fed. The extruder 16 produces a tubular film (second film material) 15. The tubular film 15 is pinched by a pair of pinch rolls 17 and folded into a sheet-like material. This film 15 is then longitudinally rolled by a pair of pressure rolls 18 and a large number of transversal slits are then formed in this rolled film 15 with a slitting roll 19 and a backing roll 20. This transversely slit film 15 is then stretched in the direction crosswise to its length with a transversely stretching device 21 such as a laterally spreading apparatus.

The next laminating section 5 is provided with a laminating device 22 in which the longitudinal web 2 and the transversal web 4 are put in layers together and heated by a laminating roll 23 to obtain a nonwoven fabric 6. This laminating roll 23 is provided with a leading-in roll 24 and a delivery roll 25. The former leading-in roll 24 leads the longitudinal web 2 and the transversal web 4 on to the laminating roll 23, and a delivery roll 25 made of, for example, rubber takes out the reticular nonwoven fabric 6 from the laminating roll 23. Subsequent to the delivery roll 25, a take-up roll 27 is provided by way of a passage over a guide roll 26.

The method for producing the reticular nonwoven fabric 6 will now be described with reference to FIG. 2.

In the longitudinally stretching line step 31, a longitudinal web forming step (a first feeding step) 32 is carried out in the first place. In this step 32, high density polyethylene and low density polyethylene are fed to the extruder 8. The introduced resins are extruded from the extruder 8 in a form of a tube to obtain a tubular film 28. This tubular film 28 is composed of three layers of an inner layer made of low density polyethylene, an intermediate layer made of high density polyethylene and an outer layer made of low density polyethylene. This tubular film 28 is folded into a sheet by being pinched with a pair of pinch rolls 9. This folded film 28 is opened by a cut-opening machine 10 into a wide web.

In the next place, the longitudinally stretching step 33 is carried out. In this step 33, the cut-opened film 28 is stretched for a predetermined ratio of stretching by means of a first stretching device 11 with a warm water bath. In this step, the width of the film 28 is reduced in accordance with the ratio of stretching. The film 28 is then stretched again for a predetermined ratio of stretching by a second stretching device 12 with hot air. Also in this step, the width of the film 28 is reduced in accordance with the ratio of stretching. Owing to this longitudinally stretching step 33, the film 28 becomes liable to split.

A splitting step 34 is then performed. In this step 34, the stretched film 28 is split in the direction parallel to the length of the film 28 with a splitting device 13. By this process, the film 28 is provided with a plurality of reticular splits.

In the next step, a laterally spreading step 35 is carried out. In this step 35, the split film 28 is transversely extended by a laterally spreading device 14 to a degree of predetermined width or mesh size to form a longitudinal web 2. This longitudinal web 2 is so heated by a heat treatment roll (not shown) as to eliminate strain. The thus obtained longitudinal web 2 is introduced into the succeeding laminating section 5.

In the transversely stretching line step 36, a transversal web forming step (a second feeding step) 37 is carried out in the first place. In this step 37, high density polyethylene of a high melting point thermoplastic resin and low density polyethylene of a low melting point thermoplastic resin are introduced into the extruder 16. The introduced resins are extruded from the extruder 16 in a form of a tube to obtain a tubular film 15. This tubular film 15 is composed of two layers, one is an outer layer made of low density polyethylene and the other is an inner layer made of high density polyethylene. This tubular film 15 is then folded into a sheet by being pinched with a pair of pinch rolls 17. This folded sheet-like film 15 is the one composed of four layers, two inner layers made of high density polyethylene and two outer layers made of low density polyethylene. However, when the four layer film 15 is passed through the succeeding longitudinally orienting step 38, the inner two layers of high density polyethylene are stuck together by blocking. Accordingly, it is possible to obtain a 3-ply film composed of one inner layer made of high density polyethylene and two outer layers made of low density polyethylene.

In the next place, the rolling step (longitudinally orienting step) 38 is carried out. In this step 38, the film 15 obtained in the web forming step 37 is longitudinally oriented for a predetermined ratio by being rolled with a pair of pressure rolls 18. In this embodiment, the ratio of rolling of the film 15 is preferable in the range of 1.5 to 5. Accordingly, the velocity of this production line can be increased owing to the elongation by rolling of the film 15.

A transversal slitting step 39 is then carried out. In this step 39, the oriented film 15 obtained in the above longitudinally orienting step 38 is introduced into the space between a slitting roll 19 and a backing roll 20, thereby forming a large number of slits in the direction crosswise to the length of the film 15 except the marginal portions. In this step, because the film 15 is previously subjected to rolling, each slit can readily be opened. Incidentally, as the slits are not formed in the marginal portions of the film 15, this marginal portions can be employed like the selvages for moving forth the web.

In the next step, a transversely stretching step 40 is carried out. In this step 40, the slit film 15 which was slit transversely in the slitting step 39 is stretched transversely by means of a transversely stretching device 21. By this process, the film 15 is formed into a reticular transversely stretched web 4. This transversely stretched web 4 is then introduced into the laminating section 5.

In the next place, the laminating step 41 is carried out. In this step 41, the longitudinally stretched web 2 and the transversely stretched web 4 are introduced into the space between the laminating roll 23 and the leading-in roll 24, wherein the transversely stretched web 4 is fed in a transversely stretched state with a cloth guiding device or else. The longitudinally stretched web 2 is introduced under an appropriate tension on the transversely stretched web 4 and the latter web 4 is pressed to the laminating roll 23. By this step, therefore, the transversely stretched web 4 is pressed against the laminating roll 23 by the longitudinally stretched web 2 and they are stuck together under the pressure of the delivery roll 25. During this procedure, the transversely stretched web 4 is subjected to an appropriate heat treatment, thereby obtaining the reticular nonwoven fabric 6. This nonwoven fabric 6 is separated from the laminating roll 23 at the delivery roll 25 and it is passed to the take-up roll 27 through a guide roll 26.

In the next step, the winding step 42 is carried out. In this step 42, the produced nonwoven fabric 6 is wound up, in which the marginal portions of the nonwoven fabric 6 are cut off by means of, for example, score cutter (not shown). Simultaneously with the cutting of marginal portions, if necessary, trimming can also be done in order to obtain a product having a predetermined width.

According to the above process, because the transversely stretching line step 36 is provided with a rolling step 38, the length of the film 15 can be enlarged as much as the degree of rolling. As a result, the whole production line is accelerated owing to the increase in the velocity of the transversely stretching line step 36.

Figure 3:
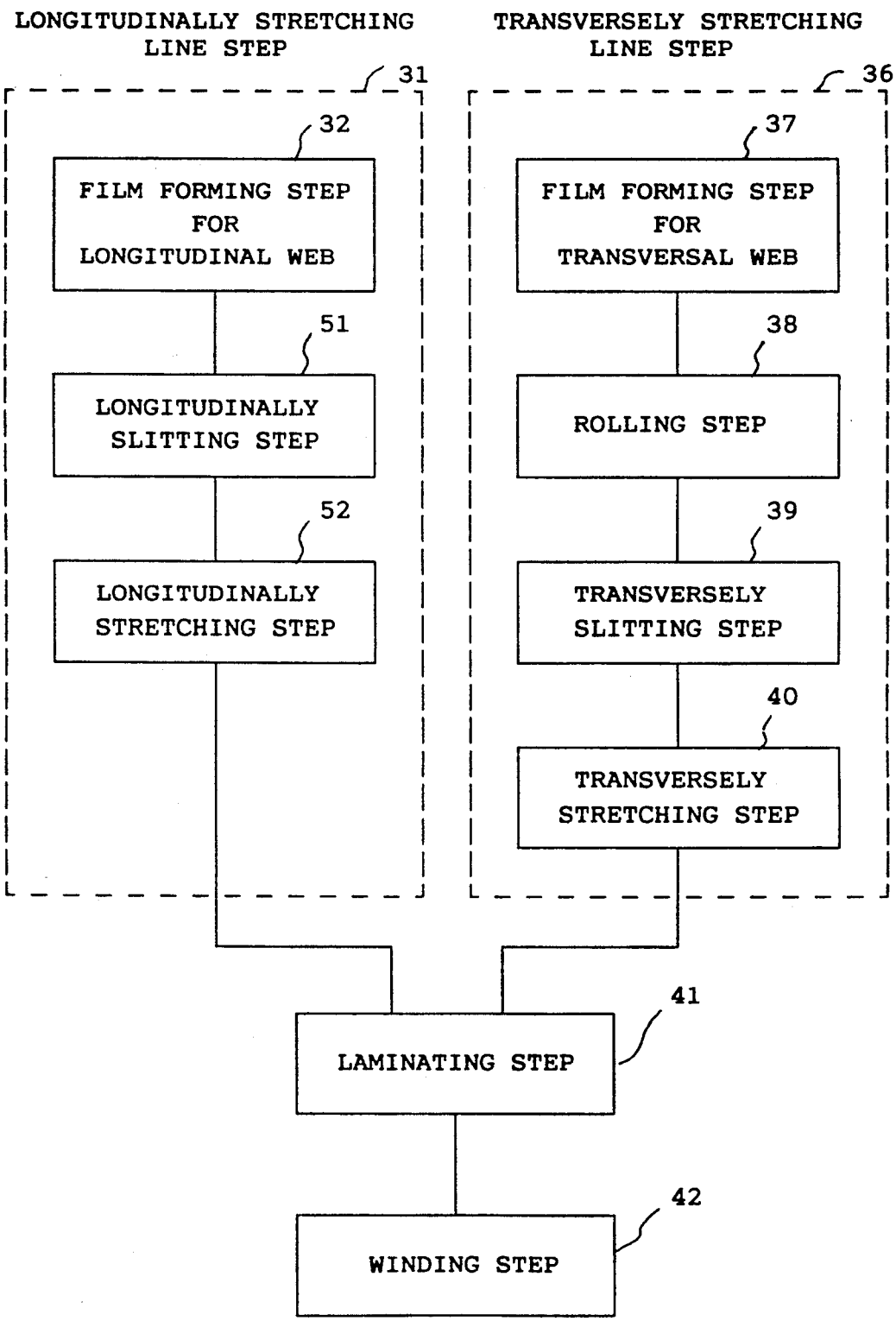
FIG. 3 is also a flow sheet of another method according to the present invention.

It is to be noted that the longitudinally stretching line step 33, the splitting step 34 and the laterally spreading step 35 in the longitudinally stretching line step 31 in the above embodiment can be replaced by a longitudinally slitting step 51 and longitudinally stretching step 52 as shown in FIG. 3.

In this embodiment, the film forming step 32 for forming the longitudinal web is followed by a longitudinally slitting step 51 in the longitudinally stretching line step 31. In the step 51, the nonoriented film 28 prepared in the film forming step 32 is introduced between a slitter and a backing roll (not shown). Through this step, longitudinal slits are formed in the film 28.

The longitudinally stretching step 52 is then carried out. In this step 52, the film 28 in which longitudinal slits are formed by the longitudinally slitting step 51, is longitudinally stretched by a longitudinally stretching device (not shown). In this procedure, the width of the film 28 is reduced according to the ratio of stretching and the meshes of net are opened as such. Thus, the film 28 is formed into a reticular longitudinal web 2. This longitudinal web 2 is introduced into the laminating step 41.

It is possible to make the longitudinal web 2 through the above process, however, the invention is not restricted to this embodiment.

In the above embodiment, the rolling step 38 is adopted in which the film is longitudinally oriented by rolling, however, this orienting step can be done by, for example, pseudo-uniaxial stretching.

Furthermore, in the above embodiment, film forming steps 32 and 37 are provided as feeding steps, however, it is also possible to feed prepared films.

Still further, it is also possible that, by supplying substrate materials after the film forming steps (feeding steps) 32 and 37, the formed films are superposed with the substrate materials. This can also be done in the laminating step in which other substrate materials are laminated together.

In the present invention as described above, because the transversely stretching line step is provided with the longitudinally orienting step, the velocity of the transversely stretching line step can be much increased, thereby attaining excellent effect of the invention to accelerate the whole production line.

What is claimed is:

1. A method of producing a reticular nonwoven fabric comprising the steps of:
    forming a first film material made of a thermoplastic resin;
    longitudinally stretching said first film material in a direction parallel to its length;
    splitting said stretched first film material in the direction of its length to form a split film having a plurality of slits;
    laterally spreading said split film in a direction crosswise to its length;
    forming a second film material made of a thermoplastic resin;
    longitudinally orienting said second film material in the direction of its length;
    transversely slitting said oriented second film material in a direction crosswise to its length;
    transversely stretching said slit second film material in a direction crosswise to its length; and
    a laminating said laterally spread first film material with said transversely stretched second film material.

2. The method for producing reticular nonwoven fabric as claimed in claim 1, wherein said longitudinally orienting step is characterized in that said second film material is stretched by means of pseudo-uniaxial orientation.

3. A method of producing a reticular nonwoven fabric comprising the steps of:
    forming a first film material made of a thermoplastic resin;
    longitudinally slitting said first film material in a direction parallel to its length;
    longitudinally stretching said slit first film material in a direction parallel to its length;
    forming a second film material made of a thermoplastic resin;
    longitudinally orienting said second film material in the direction of its length;
    transversely slitting said oriented second film material in a direction crosswise to its length;
    transversely stretching said slit second film material in a direction crosswise to its length; and
    laminating said longitudinally stretched first film material with said transversely stretched second film material.

4. The method for producing reticular nonwoven fabric as claimed in claim 1, wherein said first film material and said second film material are of layered structure comprising outer layers made of low density polyethylene and an intermediate layer made of high density polyethylene.

5. The method for producing reticular nonwoven fabric as claimed in claim 2 wherein said pseudo-axial orientation is effected by pseudo-uniaxial stretching.

6. The method for producing reticular nonwoven fabric as claimed in claim 5 wherein said pseudo-uniaxial stretching is effected by pseudo-uniaxial rolling.

7. The method for producing reticular nonwoven fabric as claimed in claim 6 wherein said pseudo-uniaxial rolling is carried out by passing said second film material through a set of closely located pressure rolls, thereby orienting said film while reducing its thickness but scarcely reducing its width.

8. The method for producing reticular nonwoven fabric as claimed in claim 3 wherein said pseudo-uniaxial rolling ratio is in the range of 1.5 to 5.

9. The method for producing reticular nonwoven fabric as claimed in claim 8 wherein said step of forming said first film material includes feeding high density polyethylene and low density polyethylene into an extruder to produce a 3-ply tubular film composed of an inner layer of low density polyethylene, an intermediate layer of high density polyethylene and an outer layer of low density polyethylene.

10. The method for producing reticular nonwoven fabric as claimed in claim 9 wherein said tubular film is pinched by a pair of pinch rolls into a folded sheet; and thereupon said sheet-like material is fed into a cut-opening machine which cuts and opens said folded tubular film into a wider film.

11. The method for producing reticular nonwoven fabric as claimed in claim 1 wherein said first film material is longitudinally stretched in a first stretching device comprising a warm water bath and further longitudinally stretched in a second stretching device using hot air.

12. The method for producing reticular nonwoven fabric as claimed in claim 1 wherein said step of forming said second film material comprises feeding a high melting point thermoplastic resin and a low melting point thermoplastic resin through an extruder.

13. The method for producing reticular nonwoven fabric as claimed in claim 12 wherein said high melting point thermoplastic resin is high density polyethylene and said low melting point thermoplastic resin is low density polyethylene.

14. The method for producing reticular nonwoven fabric as claimed in claim 12 wherein said extruder produces a tubular second film material which is then pinched by a pair of pinch rolls which folds said tubular film into a sheet-like material.

15. The method for producing reticular nonwoven fabric as claimed in claim 1 wherein said step of longitudinally orienting said first film material includes longitudinally rolling a folded sheet-like material.

16. The method for producing reticular nonwoven fabric as claimed in claim 1 wherein said transverse slitting step is provided by a slitting roll and a backing roll to form a transversely slit film.

17. The method for producing reticular nonwoven fabric as claimed in claim 16 wherein said transverse stretching step is provided by a transverse stretching device which transversely stretches said transversely slit film in a direction crosswide to its length.

18. The method for producing reticular nonwoven fabric as claimed in claim 1 wherein said laminating step is provided by a laminating device which laminates said first film material and second film material together under heating to form a nonwoven fabric.

19. The method for producing reticular nonwoven fabric as claimed in claim 18 wherein said laminating device includes a leading-in roll and a laminating roll, said leading-in roll leading said first film material and said second film material onto said laminating roll.

20. The method for producing reticular nonwoven fabric as claimed in claim 19 wherein said laminating device further includes a delivery roll, said delivery roll disposed in a pressing relationship with said laminating roll.

21. The method for producing reticular nonwoven fabric as claimed in claim 14 wherein said tubular second film material, composed of an outer low density polyethylene layer and an inner high density polyethylene layer, is folded into a sheet-like film by means of a pair of pinch rolls, said sheet-like film composed of four layers of two inner high density polyethylene layers and two outer low density polyethylene layers.

22. The method for producing reticular nonwoven fabric as claimed in claim 21 wherein the inner two layers of said high density polyethylene of said sheet-like film are thereupon stuck together to form a 3-ply film composed of one inner high density polyethylene layer and two outer low density polyethylene layers.

23. The method for producing reticular nonwoven fabric as claimed in claim 1 wherein the length of said second film material is enlarged in said orienting step, thereby accelerating the speed of the production line owing to the increased velocity of said transverse stretching step.

24. The method for producing reticular nonwoven fabric as claimed in claim 3 wherein said step of longitudinally orienting said second film material is effected by pseudo-uniaxial orientation.

25. The method for producing reticular nonwoven fabric as claimed in claim 3 wherein said first film material and said second film material are of layered structure comprising outer low density polyethylene layers and an intermediate high density polyethylene layer.

26. The method for producing reticular nonwoven fabric as claimed in claim 24 wherein said pseudo-uniaxial orientation includes pseudo-uniaxial stretching.

27. The method for producing reticular nonwoven fabric as claimed in claim 26 wherein said pseudo-uniaxial stretching is effected by pseudo-uniaxial rolling.

28. The method for producing reticular nonwoven fabric as claimed in claim 27 wherein said pseudo-uniaxial rolling ratio is in the range of 1.5 to 5.

29. The method for producing reticular nonwoven fabric as claimed in claim 28 wherein said step of forming said first film material includes feeding high density polyethylene and low density polyethylene into an extruder to produce a 3-ply tubular film composed of an inner layer of low density polyethylene, an intermediate layer of high density polyethylene and an outer layer of low density polyethylene.

30. The method for producing reticular nonwoven fabric as claimed in claim 29 wherein said tubular film is pinched by a pair of pinch rollers into a folded sheet; and thereupon said sheet-like material is fed into a cut opening machine which cuts and opens said folded tubular film into a wider film.

31. The method for producing reticular nonwoven fabric as claimed in claim 3 wherein said first film material is longitudinally stretched in a first stretching device comprising a warm water bath and further longitudinally stretched in a second stretching device using hot air.

32. The method for producing reticular nonwoven fabric as claimed in claim 3 wherein said step of forming said second film material comprises feeding a high melting point thermoplastic resin and a low melting point thermoplastic resin through an extruder.

33. The method for producing reticular nonwoven fabric as claimed in claim 32 wherein said high melting point thermoplastic resin is high density polyethylene and said low melting point thermoplastic resin is low density polyethylene.

34. The method for producing reticular nonwoven fabric as claimed in claim 32 wherein said extruder produces a tubular second film material which is then pinched by a pair of pinch rolls which folds said tubular film into a sheet-like material.

35. The method for producing reticular nonwoven fabric as claimed in claim 3 wherein said step of longitudinally orienting said first film material includes longitudinally rolling a folded sheet-like material.

36. The method for producing reticular nonwoven fabric as claimed in claim 3 wherein said transverse slitting step is provided by a slitting roll and a backing roll to form a transversely slit film.

37. The method for producing reticular nonwoven fabric as claimed in claim 36 wherein said transverse stretching step is provided by a transverse stretching device which transversely stretches said transversely slit film in a direction crosswise to its length.

38. The method for producing reticular nonwoven fabric as claimed in claim 3 wherein said laminating step is provided by a laminating device which laminates said first film material and said second film material together under heating to form a nonwoven fabric.

39. The method for producing reticular nonwoven fabric as claimed in claim 38 wherein said laminating device includes a leading-in roll and a laminating roll, said leading-in roll leading said first film material and said second film material onto said laminating roll.

40. The method for producing reticular nonwoven fabric as claimed in claim 39 wherein said laminating device further includes a delivery roll, said delivery roll disposed in pressing relationship with said laminating roll.

41. The method for producing reticular nonwoven fabric as claimed in claim 34 wherein said tubular second film material, composed of an outer low density polyethylene layer and an inner high density polyethylene layer, is folded into a sheet-like film by means of a pair of pinch rolls, said sheet-like film composed of four layers of two inner high density polyethylene layers and two outer low density polyethylene layers.

42. The method for producing reticular nonwoven fabric as claimed in claim 41 wherein the inner two layers of said high density polyethylene of said sheet-like film are thereupon struck together to form a 3-ply film composed of one inner high density polyethylene layer and two outer low density polyethylene layers.

43. The method for producing reticular nonwoven fabric as claimed in claim 3 wherein the length of said second film material is enlarged in said orienting step, thereby accelerating the speed of the production line owing to the increased velocity of said transverse stretching step.

* * * * *

UNITED STATES PATENT AND TRADEMARK OFFICE
CERTIFICATE OF CORRECTION

PATENT NO. : 5,290,377
DATED : March 1, 1994
INVENTOR(S) : Kintaro Aihara, et al.

It is certified that error appears in the above-indentified patent and that said Letters Patent is hereby corrected as shown below:

Column 6, line 32, Claim 1: delete "a"

Column 6, line 67, Claim 5: "axial" should read --uniaxial--

Column 7, line 11, Claim 8: "claim 3" should read --claim 7--

Column 8, line 56, Claim 30: "rollers" should read --rolls--

Signed and Sealed this

Twenty-ninth Day of November, 1994

Attest:

BRUCE LEHMAN

Attesting Officer                Commissioner of Patents and Trademarks